(12) United States Patent
Koban et al.

(10) Patent No.: US 12,429,265 B2
(45) Date of Patent: Sep. 30, 2025

(54) METHODS AND CONTAINERS FOR TRANSPORTING, TRANSFERRING, STORING AND USING REFRIGERANTS

(71) Applicant: THE CHEMOURS COMPANY FC, LLC., Wilmington, DE (US)

(72) Inventors: Mary E Koban, Wilmington, DE (US); Hans Westdijk, Beijerland (NL); Anthony F. Stasio, Newark, DE (US); Karl Robert Krause, Pennsylvania, PA (US); Jian Sun-Blanks, Earleville, MD (US); Sheng Peng, Hockessin, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 959 days.

(21) Appl. No.: 17/436,159

(22) PCT Filed: Mar. 6, 2020

(86) PCT No.: PCT/US2020/021425
§ 371 (c)(1),
(2) Date: Sep. 3, 2021

(87) PCT Pub. No.: WO2020/185574
PCT Pub. Date: Sep. 17, 2020

(65) Prior Publication Data
US 2022/0136748 A1    May 5, 2022

Related U.S. Application Data

(60) Provisional application No. 62/952,788, filed on Dec. 23, 2019, provisional application No. 62/815,528, filed on Mar. 8, 2019.

(51) Int. Cl.
*F25B 45/00* (2006.01)
*B01D 15/08* (2006.01)

(52) U.S. Cl.
CPC .............. *F25B 45/00* (2013.01); *B01D 15/08* (2013.01); *F25B 2345/001* (2013.01);
(Continued)

(58) Field of Classification Search
CPC ................ F25B 45/00; F25B 2345/001; F25B 2345/002; F25B 2345/004; F25B 2700/00; F25B 2700/21; B01D 15/08
(Continued)

(56) References Cited

U.S. PATENT DOCUMENTS

| 4,285,206 | A | * | 8/1981 | Koser | ................ | B60H 1/00585 |
|  |  |  |  |  |  | 62/149 |
| 5,685,161 | A | * | 11/1997 | Peckjian | .................. | F17C 5/00 |
|  |  |  |  |  |  | 62/149 |

(Continued)

FOREIGN PATENT DOCUMENTS

| JP | 2007231997 A | 9/2007 |
| JP | 2016183074 A | 10/2016 |

(Continued)

OTHER PUBLICATIONS

AHRI Standard 700, 2016 Standard for Specifications for Refrigerants, Specifications for Refrigerants, 2016, pp. 1-24, Air-Conditioning, Heating & Refrigeration Institute, Arlington, Virginia.

(Continued)

*Primary Examiner* — Joel M Attey

(57) ABSTRACT

A system and method for delivering a refrigerant to a refrigerant system. The system includes a distribution system comprising a distribution vessel, a transfer line, at least one pump, a distribution line and a distribution line branch arranged and disposed to transfer refrigerant from the distribution vessel to the refrigerant system. The system additionally includes a monitoring system comprising one or (Continued)

more sensors arranged and disposed to measure at least one distribution parameter within the distribution system and a recovery system arranged and disposed to selectively receive refrigerant based upon the refrigerant suitability for use in the refrigerant system.

7 Claims, 9 Drawing Sheets

(52) U.S. Cl.
CPC ... *F25B 2345/002* (2013.01); *F25B 2345/004* (2013.01); *F25B 2700/00* (2013.01); *F25B 2700/21* (2013.01)

(58) Field of Classification Search
USPC .......................................................... 62/77
See application file for complete search history.

(56) References Cited

U.S. PATENT DOCUMENTS

| | | |
|---|---|---|
| 6,260,372 B1 | 7/2001 | Burke |
| 6,591,629 B1* | 7/2003 | Galbreath, Jr. ......... F25B 45/00 62/85 |
| 2009/0158756 A1* | 6/2009 | Brown ............... B60H 1/00585 62/77 |
| 2015/0225632 A1* | 8/2015 | Minor .................... F25B 9/006 62/77 |
| 2017/0108247 A1 | 4/2017 | Sata et al. |

FOREIGN PATENT DOCUMENTS

| | | |
|---|---|---|
| KR | 20120103077 A | 9/2012 |
| WO | 200463645 A1 | 7/2004 |
| WO | 201263289 A1 | 5/2012 |
| WO | 2013068310 A2 | 5/2013 |
| WO | 2019213004 A1 | 11/2019 |

OTHER PUBLICATIONS

PCT International Search Report and Written Opinion for Application No. PCT/US2020/021425 mailed Jun. 22, 2020.

* cited by examiner

METHODS AND CONTAINERS FOR TRANSPORTING, TRANSFERRING, STORING AND USING REFRIGERANTS

This application claims the benefit of Application No. 62/815,528, filed on Mar. 8, 2019 and 62/952,788, filed on Dec. 23, 2019. The disclosures of Application Nos. 62/815,528 and 62/952,788 are hereby incorporated by reference.

FIELD OF THE INVENTION

The present invention is directed to refrigerant blending, transportation, transfer, and storage and use. In particular, the methods described herein prevent the formation of undesirable reaction products during any or all of these processes in combination.

BACKGROUND OF THE INVENTION

Olefinic compounds are unsaturated hydrocarbons including one or more pairs of carbon atoms linked by double bond. The unsaturated double bond provides a reactive moiety which is subject to attack by various reactive species.

Many commercial refrigerants include halogenated olefinic compounds. Hydrofluoro olefins (HFOs) and Hydrochlorofluoro olefins (HCFOs) have found utility as modern refrigerants due to their low global warming potential (GWP). During the transfer, transportation, storage and use, olefinic refrigerants may encounter adverse materials or extremely undesirable conditions that cause the double bond to react to form unwanted by-products, which reduce the refrigerant's product performance and effectiveness.

What is therefore needed are systems and methods of transporting, transferring, storing and using olefinic refrigerants, which prevent the formation of possible undesirable reaction products.

BRIEF DESCRIPTION OF THE INVENTION

In an embodiment, a method for delivering a refrigerant to a refrigerant system. The method includes providing a distribution system arranged and disposed to deliver the refrigerant to the refrigerant system and transferring the refrigerant to the refrigerant system with the distribution system. The method additionally includes measuring at least one distribution parameter of the refrigerant with one or more sensors within the distribution system and selectively directing refrigerant to either the refrigerant system or a recovery system based upon the refrigerant suitability for use in the refrigerant system in response to a comparison of at least one distribution parameter with respect to at least one threshold parameter.

In another embodiment, a system for delivering a refrigerant to a refrigerant system. The system includes a distribution system comprising a distribution vessel, a transfer line, at least one pump, a distribution line and a distribution line branch arranged and disposed to transfer refrigerant from the distribution vessel to the refrigerant system.

The transfer lines and hoses used are preferably constructed of non-polymeric material. Transfer lines and hoses should ideally be made of braided stainless steel. Additionally, the transfer lines coupling device can be of a type which limits product degradation and/or emissions such as a dry bulk coupler.

The system additionally includes a monitoring system comprising one or more sensors arranged and disposed to measure at least one distribution parameter within the distribution system and a recovery system arranged and disposed to selectively receive refrigerant based upon the refrigerant suitability for use in the refrigerant system in response to a comparison of at least one distribution parameter with respect to at least one threshold parameter.

One embodiment of the invention relates to a method for delivering a refrigerant to a refrigerant system, the method comprising:
 providing a distribution system arranged and disposed to deliver the refrigerant to the refrigerant system;
 transferring the refrigerant to the refrigerant system with the distribution system;
 measuring at least one distribution parameter of the refrigerant with one or more sensors within the distribution system; and selectively directing refrigerant to either the refrigerant system or a recovery system based upon the refrigerant suitability for use in the refrigerant system in response to a comparison of at least one distribution parameter with respect to at least one threshold parameter.

Another embodiment of the invention relates to any combination of the foregoing embodiments wherein at least one distribution parameter is selected from the group consisting of refrigerant temperature, refrigerant moisture concentration, refrigerant non-absorbable gas concentration, refrigerant non-volatile residue, refrigerant acidity and combinations thereof.

Another embodiment of the invention relates to any combination of the foregoing embodiments wherein at least one threshold parameter is selected from the group consisting of a refrigerant temperature of 100° C., a refrigerant moisture concentration of 10 ppm by weight, per AHRI 700 (2016), a refrigerant non-absorbable gas concentration of about 0.9 to about 1.5, in some cases about 0.9 to about 1.1 and typically about 0.5 to about 0.9 volume percent at 25° C., per AHRI 700 (2016), non-volatile residue <20 ppm by weight, refrigerant acidity and combinations thereof.

Another embodiment of the invention relates to any combination of the foregoing embodiments wherein the distribution system further includes a distribution vessel, a transfer line, at least one pump, a distribution line and a distribution line branch.

Another embodiment of the invention relates to any combination of the foregoing embodiments wherein the distribution line selectively mates to the refrigerant system to deliver the refrigerant to the refrigerant system.

Another embodiment of the invention relates to any combination of the foregoing embodiments wherein the sensors are arranged and disposed to measure the at least one distribution parameter at the distribution line branch prior to delivering the refrigerant to the refrigerant system.

Another embodiment of the invention relates to any combination of the foregoing embodiments wherein the recovery system includes a recovery vessel.

Another embodiment of the invention relates to any combination of the foregoing embodiments wherein the recovery system includes one or more of a recovery vessel, a dehydration module, an inert gas purge module, a non-absorbable gas reduction unit, and a filtration module.

Another embodiment of the invention relates to any combination of the foregoing embodiments wherein the selectively directing includes directing refrigerant to the recovery system when the at least one distribution parameter measured with the one or more sensors exceeds the at least one threshold parameter.

Another embodiment of the invention relates to any combination of the foregoing embodiments wherein the selectively directing includes directing refrigerant to the recovery system when a temperature measured with the one or more sensors exceeds a threshold parameter of a refrigerant temperature of 100° C.

Another embodiment of the invention relates to any combination of the foregoing embodiments wherein the selectively directing includes directing refrigerant to the recovery system when a refrigerant moisture concentration measured with the one or more sensors exceeds a threshold parameter of a refrigerant moisture concentration of 10 ppm by weight, per AHRI 700 (2016).

Another embodiment of the invention relates to any combination of the foregoing embodiments wherein the selectively directing includes directing refrigerant to the recovery system when a non-absorbable gas concentration measured with the one or more sensors exceeds a threshold parameter of a refrigerant non-absorbable gas concentration of 0.9-1.1 volume percent at 25° C., per AHRI 700 (2016).

Another embodiment of the invention relates to any combination of the foregoing embodiments wherein the non-absorbable gas is oxygen.

Another embodiment of the invention relates to any combination of the foregoing embodiments wherein the selectively directing includes directing refrigerant to the recovery system when one or more of the following threshold parameters are exceeded:
 a temperature measured with the one or more sensors exceeds a refrigerant temperature of 100° C.;
 a refrigerant moisture concentration measured with the one or more sensors exceeds a refrigerant moisture concentration of 10 ppm by weight, per AHRI 700 (2016); and
 a non-absorbable gas concentration measured with the one or more sensors exceeds a refrigerant non-absorbable gas concentration of 0.9 to 1.1 volume percent at 25° C., per AHRI 700 (2016).

One embodiment of the invention relates to a system for delivering a refrigerant to a refrigerant system, the system comprising:
 a distribution system comprising a distribution vessel, a transfer line, at least one pump, a distribution line and a distribution line branch arranged and disposed to transfer refrigerant from the distribution vessel to the refrigerant system;
 a monitoring system comprising one or more sensors arranged and disposed to measure at least one distribution parameter within the distribution system; and
 a recovery system arranged and disposed to selectively receive refrigerant based upon the refrigerant suitability for use in the refrigerant system in response to a comparison of the at least one distribution parameter with respect to at least one threshold parameter.

Another embodiment of the invention relates to any combination of the foregoing embodiments wherein the one or more sensors arranged and disposed to measure distribution parameters selected from the group consisting of refrigerant temperature, refrigerant moisture concentration, refrigerant non-absorbable gas concentration, refrigerant acidity and combinations thereof.

Another embodiment of the invention relates to any combination of the foregoing embodiments wherein the recovery system receives refrigerant when one or more of the following threshold parameters are exceeded:
 a temperature measured with the one or more sensors exceeds a refrigerant temperature of 100° C.;
 a refrigerant moisture concentration measured with the one or more sensors exceeds a refrigerant moisture concentration of 10 ppm by weight, per AHRI 700 (2016); and
 a non-absorbable gas concentration measured with the one or more sensors exceeds a refrigerant non-absorbable gas concentration of 1.5 volume percent at 25° C., per AHRI 700 (2016).

Another embodiment of the invention relates to any combination of the foregoing embodiments wherein the recovery system receives refrigerant when a refrigerant temperature measured with the one or more sensors exceeds a threshold parameter of 100° C.

Another embodiment of the invention relates to any combination of the foregoing embodiments wherein the recovery system receives refrigerant when a refrigerant moisture concentration measured with the one or more sensors exceeds a threshold parameter of 10 ppm by weight, per AHRI 700 (2016).

Another embodiment of the invention relates to any combination of the foregoing embodiments wherein the recovery system receives refrigerant when a non-absorbable gas concentration measured with the one or more sensors exceeds a threshold parameter gas concentration of 1.5 volume percent at 25° C., per AHRI 700 (2016).

Another embodiment of the invention relates to any combination of the foregoing embodiments wherein the recovery system includes a recovery vessel.

Another embodiment of the invention relates to any combination of the foregoing wherein the recovery system includes one or more of a recovery vessel, a dehydration module, an inert gas purge module, a non-absorbable gas reduction unit, and a filtration module.

Another embodiment of the invention relates to any combination of the foregoing wherein the recovery system includes one or more of a recovery vessel, a dehydration module, an inert gas purge module, a non-absorbable gas reduction unit, and a filtration module.

Another embodiment of the invention relates to any combination of the foregoing wherein the distribution line is configured to mate to the refrigerant system and deliver the refrigerant to the refrigerant system.

Another embodiment of the invention relates to any combination of the foregoing wherein the sensors are arranged to measure the at least one distribution parameter prior to delivering the refrigerant to the refrigerant system.

The various aspects and embodiments of the invention can be used alone or in combinations with each other. Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The instant invention can solve problems caused by decomposition, contamination and undesired reaction of refrigerants (and refrigerant blends) caused by improper handling, storage and transferring refrigerants.

Figure 1:
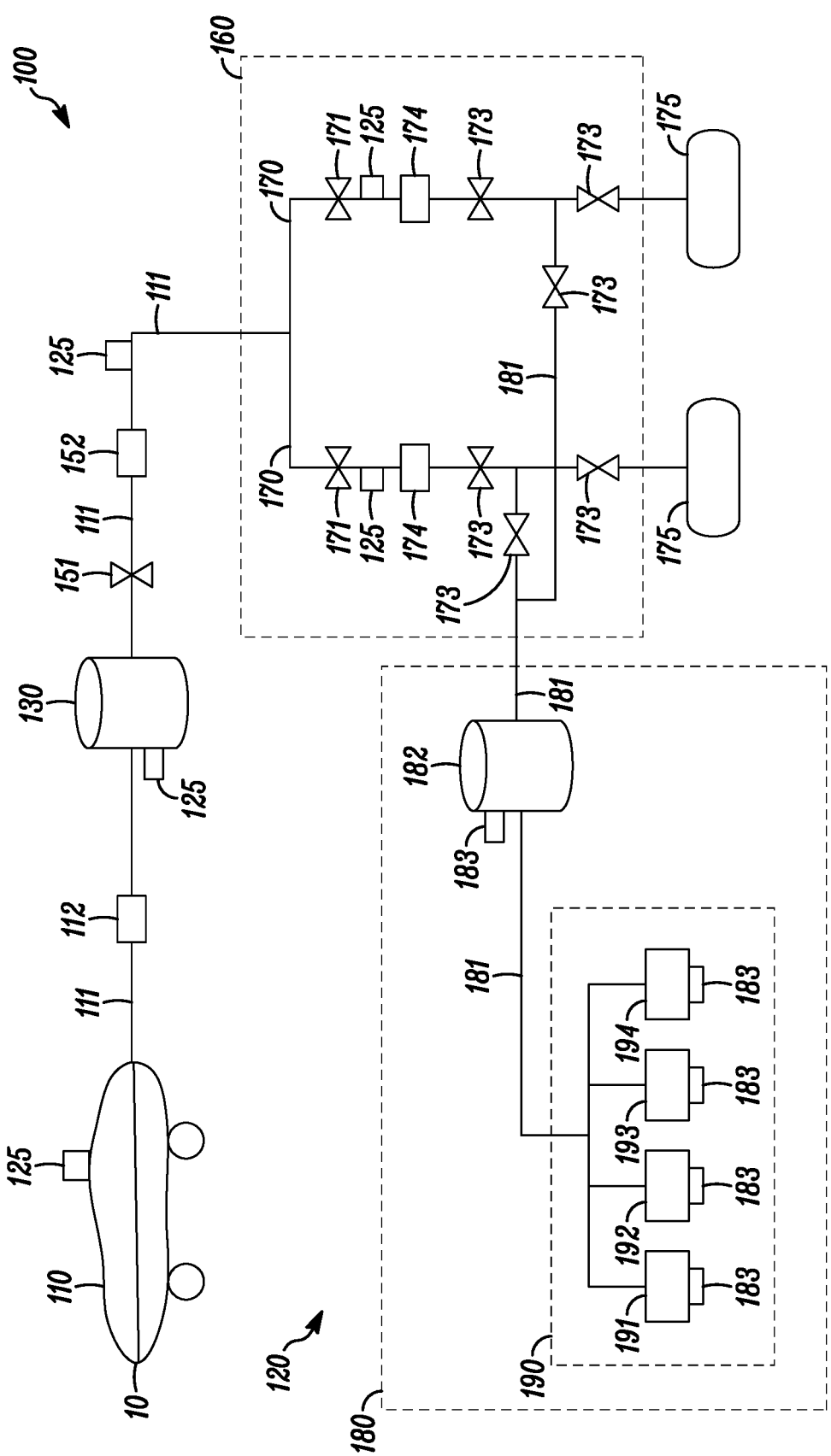
FIG. 1 is a perspective view of a refrigerant distribution system according to an embodiment of the present disclosure.

Provided is a method and system of transporting and transferring, olefinic refrigerants, which prevents the formation of undesirable reaction products Embodiments of the present disclosure, for example, in comparison to concepts failing to include one or more of the features disclosed herein, A refrigerant distribution system 100, is described in FIG. 1. In the example of FIG. 1, a delivery vessel 110 containing a refrigerant composition 115 is sampled by a monitoring system 120 including a distribution sensor 125. The monitoring system 120 receives at least one distribution parameter of the refrigerant composition 115 from the distribution sensor 125. At least one distribution parameter may include temperature, moisture concentration, non-absorbable gas (NAG) concentration, acidity, and combinations thereof. NAGs include atmospheric gases (which is typically comprised of 78% nitrogen, 21% oxygen, and about 1% argon), accumulated in the vapor phase of refrigerants where the solubility of air in the refrigerant liquid phase is relatively low. While reducing the total amount of NAG contained within said refrigerant (dissolved within the liquid refrigerant) may be desirable, it is typically more desirable to reduce the oxygen containing portion of the NAG preferentially over the nitrogen portion. The oxygen containing portion, under certain scenarios, may increase the propensity of the refrigerant to decompose or form unwanted polymeric materials.

In one embodiment, a stabilizer or polymer inhibitor material can be introduced into distribution system 100. The stabilizer or polymer inhibitor material can reduce (or eliminate formation of) unwanted polymeric materials. The stabilizer or polymer inhibitor material can be introduced in response to detection of an oxidant concentration exceeds a threshold. While any suitable polymer inhibitor or stabilizer can be employed, examples of suitable inhibitors or stabilizers are disclosed in WO2019213004A1; the disclosure of which is hereby incorporated by reference.

The monitoring system 120 determines whether the at least one distribution parameter is below at least one distribution predetermined threshold. If the at least one distribution parameter is below the at least one distribution predetermined threshold, the refrigerant composition 115 is suitable for distribution. In some embodiments, at least one distribution parameter includes temperature, moisture concentration, non-absorbable gas (NAG) concentration, acidity, oxidant, particles, and combinations thereof. In some embodiments, at least one distribution predetermined threshold includes a temperature of no more than 100° C., moisture level of 10 ppm by weight, per AHRI 700 (2016), a NAG concentration of less than 1.5 volume percent at 25° C., per AHRI 700 (2016), and combinations thereof. Although FIG. 1 shows a sensor 125 on the delivery vessel 110, in other embodiments, sensor 125 on the delivery vessel 110 may be omitted. In other embodiments, at least one distribution predetermined threshold includes a temperature of no more than 120° C., moisture level of 10 ppm by weight, per AHRI 700 (2016), a NAG concentration of less than 0.9 volume percent at 25° C., per AHRI 700 (2016), and combinations thereof. Although FIG. 1 shows a sensor 125 on the delivery vessel 110, in other embodiments, sensor 125 on the delivery vessel 110 may be omitted.

In one embodiment the monitoring system employs an in-line apparatus for detecting the presence of a distribution parameter. The in-line apparatus can be located at any suitable location or locations within the distribution system. For example, an in-line GC/MS apparatus for detecting the presence of oxidants.

In another embodiment, the one distribution predetermined threshold includes a temperature of no more than 100° C., moisture level of 10 ppm by weight, per AHRI 700 (2016), a NAG concentration of less than 0.9 volume percent at 25° C., per AHRI 700 (2016). Although FIG. 1 shows a sensor 125 on the delivery vessel 110, in other embodiments, sensor 125 on the delivery vessel 110 may be omitted.

In some embodiments, the refrigerant composition 115 may include a hydrofluoro olefin or hydrochlorofluoro olefin, or hydrofluoroidio olefin. In some embodiments, the refrigerant composition 115 includes the a hydrofluoro olefin or hydrochlorofluoro olefin in an amount of at least 0.5 wt percent up to and including 99.5 weight percent, based on the total refrigerant composition 115. In some embodiments, the hydrofluoro olefin includes at least one:
fluoroolefins selected from the group consisting of:
1,2,3,3,3-pentafluoro-1-propene (CHF=CFCF$_3$),
1,1,3,3,3-pentafluoro-1-propene (CF$_2$=CHCF$_3$),
1,1,2,3,3-pentafluoro-1-propene (CF$_2$=CFCHF$_2$),
1,2,3,3-tetrafluoro-1-propene (CHF=CFCHF$_2$),
2,3,3,3-tetrafluoro-1-propene (CH$_2$=CFCF$_3$),
1,3,3,3-tetrafluoro-1-propene (CHF=CHCF$_3$),
1,1,2,3-tetrafluoro-1-propene (CF$_2$=CFCH$_2$F),
1,1,3,3-tetrafluoro-1-propene (CF$_2$=CHCHF$_2$),
1,2,3,3-tetrafluoro-1-propene (CHF=CFCHF$_2$),
3,3,3-trifluoro-1-propene (CH$_2$=CHCF$_3$),
2,3,3-trifluoro-1-propene (CHF$_2$CF=CH$_2$);
1,1,2-trifluoro-1-propene (CH$_3$CF=CF$_2$);
1,2,3-trifluoro-1-propene (CH$_2$FCF=CF$_2$);
1,1,3-trifluoro-1-propene (CH$_2$FCH=CF$_2$);
1,3,3-trifluoro-1-propene (CHF$_2$CH=CHF);
1,1,1,2,3,4,4,4-octafluoro-2-butene (CF$_3$CF=CFCF$_3$);
1,1,2,3,3,4,4,4-octafluoro-1-butene (CF$_3$CF$_2$CF=CF$_2$);
1,1,1,2,4,4,4-heptafluoro-2-butene (CF$_3$CF=CHCF$_3$);
1,2,3,3,4,4,4-heptafluoro-1-butene (CHF=CFCF$_2$CF$_3$);
1,1,1,2,3,4,4-heptafluoro-2-butene (CHF$_2$CF=CFCF$_3$);
1,3,3,3-tetrafluoro-2-(trifluoromethyl)-1-propene ((CF$_3$)$_2$C=CHF);
1,1,3,3,4,4,4-heptafluoro-1-butene (CF$_2$=CHCF$_2$CF$_3$);
1,1,2,3,4,4,4-heptafluoro-1-butene (CF$_2$=CFCHFCF$_3$);
1,1,2,3,3,4,4-heptafluoro-1-butene (CF$_2$=CFCF$_2$CHF$_2$);
2,3,3,4,4,4-hexafluoro-1-butene (CF$_3$CF$_2$CF=CH$_2$);
1,3,3,4,4,4-hexafluoro-1-butene (CHF=CHCF$_2$CF$_3$);
1,2,3,4,4,4-hexafluoro-1-butene (CHF=CFCHFCF$_3$);

1,2,3,3,4,4-hexafluoro-1-butene (CHF=CFCF$_2$CHF$_2$);
1,1,2,3,4,4-hexafluoro-2-butene (CHF$_2$CF=CFCHF$_2$);
1,1,1,2,3,4-hexafluoro-2-butene (CH$_2$FCF=CFCF$_3$);
1,1,1,2,4,4-hexafluoro-2-butene (CHF$_2$CH=CFCF$_3$);
1,1,1,3,4,4-hexafluoro-2-butene (CF$_3$CH=CFCHF$_2$);
1,1,2,3,3,4-hexafluoro-1-butene (CF$_2$=CFCF$_2$CH$_2$F);
1,1,2,3,4,4-hexafluoro-1-butene (CF$_2$=CFCHFCHF$_2$);
3,3,3-trifluoro-2-(trifluoromethyl)-1-propene (CH$_2$=C(CF$_3$)$_2$);
1,1,1,2,4-pentafluoro-2-butene (CH$_2$FCH=CFCF$_3$);
1,1,1,3,4-pentafluoro-2-butene (CF$_3$CH=CFCH$_2$F);
3,3,4,4,4-pentafluoro-1-butene (CF$_3$CF$_2$CH=CH$_2$);
1,1,1,4,4-pentafluoro-2-butene (CHF$_2$CH=CHCF$_3$);
1,1,1,2,3-pentafluoro-2-butene (CH$_3$CF=CFCF$_3$);
2,3,3,4,4-pentafluoro-1-butene (CH$_2$=CFCF$_2$CHF$_2$);
1,1,2,4,4-pentafluoro-2-butene (CHF$_2$CF=CHCHF$_2$);
1,1,2,3,3-pentafluoro-1-butene (CH$_3$CF$_2$CF=CF$_2$);
1,1,2,3,4-pentafluoro-2-butene (CH$_2$FCF=CFCHF$_2$);
1,1,3,3,3-pentafluoro-2-methyl-1-propene (CF$_2$=C(CF$_3$)(CH$_3$));
2-(difluoromethyl)-3,3,3-trifluoro-1-propene (CH$_2$=C(CHF$_2$)(CF$_3$));
2,3,4,4,4-pentafluoro-1-butene (CH$_2$=CFCHFCF$_3$);
1,2,4,4,4-pentafluoro-1-butene (CHF=CFCH$_2$CF$_3$);
1,3,4,4,4-pentafluoro-1-butene (CHF=CHCHFCF$_3$);
1,3,3,4,4-pentafluoro-1-butene (CHF=CHCF$_2$CHF$_2$);
1,2,3,4,4-pentafluoro-1-butene (CHF=CFCHFCHF$_2$);
3,3,4,4-tetrafluoro-1-butene (CH$_2$=CHCF$_2$CHF$_2$);
1,1-difluoro-2-(difluoromethyl)-1-propene (CF$_2$=C(CHF$_2$)(CH$_3$));
1,3,3,3-tetrafluoro-2-methyl-1-propene (CHF=C(CF$_3$)(CH$_3$));
3,3-difluoro-2-(difluoromethyl)-1-propene (CH$_2$=C(CHF$_2$)$_2$);
1,1,1,2-tetrafluoro-2-butene (CF$_3$CF=CHCH$_3$);
1,1,1,3-tetrafluoro-2-butene (CH$_3$CF=CHCF$_3$);
1,1,1,2,3,4,4,5,5,5-decafluoro-2-pentene (CF$_3$CF=CFCF$_2$CF$_3$);
1,1,2,3,3,4,4,5,5,5-decafluoro-1-pentene (CF$_2$=CFCF$_2$CF$_2$CF$_3$);
1,1,1,4,4,4-hexafluoro-2-(trifluoromethyl)-2-butene ((CF$_3$)$_2$C=CHCF$_3$);
1,1,1,2,4,4,5,5,5-nonafluoro-2-pentene (CF$_3$CF=CHCF$_2$CF$_3$);
1,1,1,3,4,4,5,5,5-nonafluoro-2-pentene (CF$_3$CH=CFCF$_2$CF$_3$);
1,2,3,3,4,4,5,5,5-nonafluoro-1-pentene (CHF=CFCF$_2$CF$_2$CF$_3$);
1,1,3,3,4,4,5,5,5-nonafluoro-1-pentene (CF$_2$=CHCF$_2$CF$_2$CF$_3$);
1,1,2,3,3,4,4,5,5-nonafluoro-1-pentene (CF$_2$=CFCF$_2$CF$_2$CHF$_2$);
1,1,2,3,4,4,5,5,5-nonafluoro-2-pentene (CHF$_2$CF=CFCF$_2$CF$_3$);
1,1,1,2,3,4,4,5,5-nonafluoro-2-pentene (CF$_3$CF=CFCF$_2$CHF$_2$);
1,1,1,2,3,4,5,5,5-nonafluoro-2-pentene (CF$_3$CF=CFCHFCF$_3$);
1,2,3,4,4,4-hexafluoro-3-(trifluoromethyl)-1-butene (CHF=CFCF(CF$_3$)$_2$);
1,1,2,4,4,4-hexafluoro-3-(trifluoromethyl)-1-butene (CF$_2$=CFCH(CF$_3$)$_2$);
1,1,1,4,4,4-hexafluoro-2-(trifluoromethyl)-2-butene (CF$_3$CH=C(CF$_3$)$_2$);
1,1,3,4,4,4-hexafluoro-3-(trifluoromethyl)-1-butene (CF$_2$=CHCF(CF$_3$)$_2$);

2,3,3,4,4,5,5,5-octafluoro-1-pentene (CH$_2$=CFCF$_2$CF$_2$CF$_3$);
1,2,3,3,4,4,5,5-octafluoro-1-pentene (CHF=CFCF$_2$CF$_2$CHF$_2$);
3,3,4,4,4-pentafluoro-2-(trifluoromethyl)-1-butene (CH$_2$=C(CF$_3$)CF$_2$CF$_3$);
1,1,4,4,4-pentafluoro-3-(trifluoromethyl)-1-butene (CF$_2$=CHCH(CF$_3$)$_2$);
1,3,4,4,4-pentafluoro-3-(trifluoromethyl)-1-butene (CHF=CHCF(CF$_3$)$_2$);
1,1,4,4,4-pentafluoro-2-(trifluoromethyl)-1-butene (CF$_2$=C(CF$_3$)CH$_2$CF$_3$);
3,4,4,4-tetrafluoro-3-(trifluoromethyl)-1-butene ((CF$_3$)$_2$CFCH=CH$_2$);
3,3,4,4,5,5,5-heptafluoro-1-pentene (CF$_3$CF$_2$CF$_2$CH=CH$_2$);
2,3,3,4,4,5,5-heptafluoro-1-pentene (CH$_2$=CFCF$_2$CF$_2$CHF$_2$);
1,1,3,3,5,5,5-heptafluoro-1-butene (CF$_2$=CHCF$_2$CH$_2$CF$_3$);
1,1,1,2,4,4,4-heptafluoro-3-methyl-2-butene (CF$_3$CF=C(CF$_3$)(CH$_3$));
2,4,4,4-tetrafluoro-3-(trifluoromethyl)-1-butene (CH$_2$=CFCH(CF$_3$)$_2$);
1,4,4,4-tetrafluoro-3-(trifluoromethyl)-1-butene (CHF=CHCH(CF$_3$)$_2$);
1,1,1,4-tetrafluoro-2-(trifluoromethyl)-2-butene (CH$_2$FCH=C(CF$_3$)$_2$);
1,1,1,3-tetrafluoro-2-(trifluoromethyl)-2-butene (CH$_3$CF=C(CF$_3$)$_2$);
1,1,1-trifluoro-2-(trifluoromethyl)-2-butene ((CF$_3$)$_2$C=CHCH$_3$);
3,4,4,5,5,5-hexafluoro-2-pentene (CF$_3$CF$_2$CF=CHCH$_3$);
1,1,1,4,4,4-hexafluoro-2-methyl-2-butene (CF$_3$C(CH$_3$)=CHCF$_3$);
3,3,4,5,5,5-hexafluoro-1-pentene (CH$_2$=CHCF$_2$CHFCF$_3$);
4,4,4-trifluoro-2-(trifluoromethyl)-1-butene (CH$_2$=C(CF$_3$)CH$_2$CF$_3$);
1,1,2,3,3,4,4,5,5,6,6,6-dodecafluoro-1-hexene (CF$_3$(CF$_2$)$_3$CF=CF$_2$);
1,1,1,2,2,3,4,5,5,6,6,6-dodecafluoro-3-hexene (CF$_3$CF$_2$CF=CFCF$_2$CF$_3$);
1,1,1,4,4,4-hexafluoro-2,3-bis(trifluoromethyl)-2-butene ((CF$_3$)$_2$C=C(CF$_3$)$_2$);
1,1,1,2,3,4,5,5,5-nonafluoro-4-(trifluoromethyl)-2-pentene ((CF$_3$)$_2$CFCF=CFCF$_3$);
1,1,1,4,4,5,5,5-octafluoro-2-(trifluoromethyl)-2-pentene ((CF$_3$)$_2$C=CHC$_2$F$_5$);
1,1,1,3,4,5,5,5-octafluoro-4-(trifluoromethyl)-2-pentene ((CF$_3$)$_2$CFCF=CHCF$_3$);
3,3,4,4,5,5,6,6,6-nonafluoro-1-hexene (CF$_3$CF$_2$CF$_2$CF$_2$CH=CH$_2$);
4,4,4-trifluoro-3,3-bis(trifluoromethyl)-1-butene (CH$_2$=CHC(CF$_3$)$_3$);
1,1,1,4,4,4-hexafluoro-3-methyl-2-(trifluoromethyl)-2-butene ((CF$_3$)$_2$C=C(CH$_3$)(CF$_3$));
2,3,3,5,5,5-hexafluoro-4-(trifluoromethyl)-1-pentene (CH$_2$=CFCF$_2$CH(CF$_3$)$_2$);
1,1,1,2,4,4,5,5,5-nonafluoro-3-methyl-2-pentene (CF$_3$CF=C(CH$_3$)CF$_2$CF$_3$);
1,1,1,5,5,5-hexafluoro-4-(trifluoromethyl)-2-pentene (CF$_3$CH=CHCH(CF$_3$)$_2$);
3,4,4,5,5,6,6,6-octafluoro-2-hexene (CF$_3$CF$_2$CF$_2$CF=CHCH$_3$);
3,3,4,4,5,5,6,6-octafluoro1-hexene (CH$_2$=CHCF$_2$CF$_2$CF$_2$CHF$_2$);

1,1,1,4,4-pentafluoro-2-(trifluoromethyl)-2-pentene $((CF_3)_2C=CHCF_2CH_3)$;
4,4,5,5,5-pentafluoro-2-(trifluoromethyl)-1-pentene $(CH_2=C(CF_3)CH_2C_2F_5)$;
3,3,4,4,5,5,5-heptafluoro-2-methyl-1-pentene $(CF_3CF_2CF_2C(CH_3)=CH_2)$;
4,4,5,5,6,6,6-heptafluoro-2-hexene $(CF_3CF_2CF_2CH=CHCH_3)$;
4,4,5,5,6,6,6-heptafluoro-1-hexene $(CH_2=CHCH_2CF_2C_2F_5)$;
1,1,1,2,2,3,4-heptafluoro-3-hexene $(CF_3CF_2CF=CFC_2H_5)$;
4,5,5,5-tetrafluoro-4-(trifluoromethyl)-1-pentene $(CH_2=CHCH_2CF(CF_3)_2)$;
1,1,1,2,5,5,5-heptafluoro-4-methyl-2-pentene $(CF_3CF=CHCH(CF_3)(CH_3))$;
1,1,1,3-tetrafluoro-2-(trifluoromethyl)-2-pentene $((CF_3)_2C=CFC_2H_5)$;
1,1,1,2,3,4,4,5,5,6,6,7,7,7-tetradecafluoro-2-heptene $(CF_3CF=CFCF_2CF_2C_2F_5)$;
1,1,1,2,2,3,4,5,5,6,6,7,7,7-tetradecafluoro-3-heptene $(CF_3CF_2CF=CFCF_2C_2F_5)$;
1,1,1,3,4,4,5,5,6,6,7,7,7-tridecafluoro-2-heptene $(CF_3CH=CFCF_2CF_2C_2F_5)$;
1,1,1,2,4,4,5,5,6,6,7,7,7-tridecafluoro-2-heptene $(CF_3CF=CHCF_2CF_2C_2F_5)$;
1,1,1,2,2,4,5,5,6,6,7,7,7-tridecafluoro-3-heptene $(CF_3CF_2CH=CFCF_2C_2F_5)$;
1,1,1,2,2,3,5,5,6,6,7,7,7-tridecafluoro-3-heptene $(CF_3CF_2CF=CHCF_2C_2F_5)$;
pentafluoroethyl trifluorovinyl ether $(CF_2=CFOCF_2CF_3)$; and
trifluoromethyl trifluorovinyl ether $(CF_2=CFOCF_3)$.

The delivery vessel 110 may be transported from a first location to a second location. The delivery vessel 110 may be transported by any suitable mode of transportation.

At least a portion of the refrigerant composition 115 is transferred from the delivery vessel 110, via a distribution line 111, optionally including a transfer pump 112, to a distribution vessel 130, at the second location. The refrigerant composition 115 may be sampled during, and/or after transfer to the distribution vessel 130, by the monitoring system 120. The monitoring system 120 may include a distribution sensor 125, configured to sample the refrigerant composition 115 within the distribution vessel 130. The monitoring system 120 receives at least one distribution parameter of the refrigerant composition 115 from the distribution sensor 125. The at least one distribution parameter may include temperature, moisture concentration, non-absorbable gas (NAG) concentration, acidity, and combinations thereof. The monitoring system 120 determines whether the at least one distribution parameter is below at least one distribution predetermined threshold. If the at least one distribution parameter is below the at least one distribution predetermined threshold, the refrigerant composition 115 is suitable for further distribution. Although FIG. 1 shows a sensor 125 on the distribution vessel 130, in other embodiments, sensor 125 on the distribution vessel 130 may be omitted.

In some embodiments, the at least one distribution parameter includes temperature, moisture concentration, non-absorbable gas (NAG) concentration, acidity, and combinations thereof. In some embodiments, the at least one distribution parameter may include the at least one distribution parameter. In some embodiments the at least one distribution parameter and the at least one distribution parameter are the same.

In some embodiments, the at least one distribution predetermined threshold includes a temperature of 100° C., moisture level of 10 ppm by weight, per AHRI 700 (2016), a NAG concentration of less than 1.1 volume percent at 25° C., per AHRI 700 (2016), and combinations thereof. In some embodiments, the at least one distribution predetermined threshold may include the at least one predetermined threshold. In some embodiments the at least one predetermined threshold and the at least one distribution predetermined threshold are the same.

The distribution system 100 may transfer at least a portion of the refrigerant composition 115 to an end user. A distribution line 111 is connected to the distribution vessel 130 via a distribution valve 151. The operation of the distribution valve 151 may be regulated by the monitoring system 120, based on user inputs, data from one or more sensors, other data, and combinations thereof. The distribution valve 151 may be used to regulate the flow of the refrigerant composition 115. The pressure within the distribution line may be regulated by one or more distribution pumps 152. One or more distribution sensors 125 are configured to sample the refrigerant composition 115 within the distribution line 111. The monitoring system 120 receives at least one distribution parameter of the refrigerant composition 115 from the one or more distribution sensors 125. The at least one distribution parameter may include temperature, moisture concentration, non-absorbable gas (NAG) concentration, acidity, and combinations thereof. The monitoring system 120 determines whether the at least one distribution parameter is below at least one predetermined threshold. If the at least one distribution parameter is below the at least one predetermined threshold, the refrigerant composition 115 is suitable for transmission to the end user. Although FIG. 1 shows a sensor 125 on the distribution line 111, in other embodiments, sensor 125 on the distribution line 111 may be omitted.

A rack system 160 may be used to deliver the refrigerant composition 115 to one or more end user refrigerant systems 175. The rack system 160 allows the refrigerant composition 115 to be simultaneously delivered to a plurality of end user refrigerant systems 175. One or more distribution sensors 125 are configured to sample the refrigerant composition 115 within the distribution line 111. The monitoring system 120 receives at least one distribution parameter of the refrigerant composition 115 from the one or more distribution sensors 125. The at least one distribution parameter may include temperature, moisture concentration, non-absorbable gas (NAG) concentration, acidity, and combinations thereof. The monitoring system 120 determines whether the at least one distribution parameter is below at least one distribution predetermined threshold. If the at least one distribution parameter is below the at least one rack line predetermined threshold, the refrigerant composition 115 is provided to the end user.

The distribution line 111 may include a plurality of distribution line branches 170. Each distribution line branch 170 may be configured to independently deliver the refrigerant composition 115 to the end user. The distribution line branches 170 may further include a distribution line branch valve 171, which is able to regulate the flow of the refrigerant composition 115 in the distribution line branch 170. The distribution line branches may also include one or more distribution line sensors 125 configured to sample the refrigerant composition 115 within the distribution line branch 170. The monitoring system 120 receives at least one distribution line parameter of the refrigerant composition 115 from the one or more distribution line sensors 125. The at least one distribution line parameter may include temperature, moisture concentration, non-absorbable gas (NAG) concentration, acidity, and combinations thereof. The monitoring system 120 determines whether the at least one distribution line parameter is below at least one distribution line predetermined threshold. If the at least one distribution line parameter is below the at least one distribution line predetermined threshold, the refrigerant composition 115 is provided to the end user via a rack transfer valve 173. The distribution line branches 170 may additionally include a backflow prevention device 174, to prevent the backflow of the refrigerant composition 115 and possible introduction of external materials.

In some embodiments, the rack transfer valve 173 may include a nozzle portion configured to be detachably in fluid communication with an end user system refrigerant system 175.

If the monitoring system 120 determines the at least one distribution line parameter is above the at least one distribution line predetermined threshold, one or more properties of the refrigerant composition 115 may have changed, resulting an unreclaimed refrigerant composition, which does not meet the desired specifications. If the monitoring system 120 determines the at least one distribution line parameter is above the at least one distribution line predetermined threshold during rack line branch of the refrigerant composition 115. The monitoring system 120 may regulate the dispensing of the refrigerant composition 115 to the end user refrigerant system 175. In some embodiments, the monitoring system 120 may close one or more valves 151, 171, 173, to discontinue the dispensing of the refrigerant composition 115.

The distribution line branch 170 may be detached from the end user system refrigerant system 175, to prevent the unreclaimed refrigerant composition from being transferred to the end user system refrigerant systems 175. The distribution line branch 170 may then be detachably connected to a recovery system 180. The distribution line branch 170 may then be purged of the unreclaimed refrigerant composition. The reclaimed refrigerant composition and purge materials may then be recovered and reclaimed. The recovery of the unreclaimed refrigerant composition additionally prevents the release of the unreclaimed refrigerant composition into the environment.

The recovery system 180 includes a recovery line 181, configured to selectively or detachably connect to the distribution line branch 170, allowing the unreclaimed refrigerant composition to be transferred to one or more recovery vessels 182.

The one or more recovery vessels 182 may store the unreclaimed refrigerant composition until it is treated by a treatment unit 190, having one or more treatment modules. The treatment modules may alter the composition of the unreclaimed refrigerant composition to return the properties of the unreclaimed refrigerant composition to within the desired specifications.

The recovery system 180 may additionally include one or more recovery system sensors 183, which may sample the properties of the unreclaimed refrigerant composition in the one or more recovery vessels 182 and/or after treatment by the one or more treatment modules. The monitoring system 120 may receive one or more recovery parameters from the one or more recovery sensors 183. In some embodiments, the recovery parameters may include temperature, moisture concentration, non-condensable material concentration (e.g. oxygen concentration), insoluble particulate concentration, color, and/or acidity (e.g. total acid number). The monitoring system 120 may then direct the unreclaimed refrigerant composition to the one or more treatment modules of the treatment unit 190, based on the received parameters.

In an embodiment, the treatment unit 190 includes a dehydration module 191. The dehydration module 191 may be used to remove water from the unreclaimed refrigerant composition. For example, the dehydration module 191 may contact the unreclaimed refrigerant composition with a desiccant, such as molecular sieves. The dehydration may result in the concentration of the one or more impurities being reduced to less than one or more predetermined thresholds in the unreclaimed refrigerant composition. In some embodiments, the moisture concentration may be altered, resulting in a moisture level of less than 20 ppm by weight, per AHRI 700 (2016). In one embodiment, the moisture concentration may be altered, resulting in a moisture level of less than 10 ppm by weight, per AHRI 700 (2016).

In an embodiment, the treatment unit 190 includes an inert gas purge module 192. The inert gas purge module 192 may contact the unreclaimed refrigerant composition with an inert gas, such as nitrogen, argon, or xenon, to displace dissolved reactive gases in the unreclaimed refrigerant composition. In one embodiment, the inert gas may include dry nitrogen. The inert gas purge may result in the concentration of the one or more components being altered to less than one or more predetermined thresholds in the unreclaimed refrigerant composition. In one embodiment, the concentration of non-condensable materials may be altered, resulting in a concentration of less than 1.5 volume percent at 25° C., per AHRI 700 (2016).

In an embodiment, the treatment unit 190 includes a NAG reduction unit 193. The NAG reduction unit 133 may contact the unreclaimed refrigerant composition with a reducing agent, such as a metal powder, which may react with oxygen or other oxidizable components of the unreclaimed refrigerant composition. In one embodiment, the reducing agent may include iron powder. Treatment by the NAG reduction unit 193 may result in the concentration of one or components of the unreclaimed refrigerant composition being reduced to less than one or more predetermined thresholds in the unreclaimed refrigerant composition. In one embodiment, the concentration of non-condensable materials may be altered, resulting in a concentration of NAG (and other oxidants) being less than 1.5 volume percent at 25° C., per AHRI 700 (2016).

In another embodiment, a condenser is used in conjunction with a cooling medium that is sufficiently cold enough to condense the refrigerant and allow the NAGs pass through with minimal loss of refrigerant. A compressor can be used in conjunction with the condenser to increase the pressure and enhance condensation of the refrigerant at a higher temperature.

In another embodiment, a membrane that is selective for NAGS in employed. In particular, a membrane is positioned in a manner sufficient for the NAGs to pass through the membrane and in turn are removed while the refrigerant does not permeate thereby separating the NAGs from the refrigerant.

In an embodiment, the treatment unit 190 includes a filtration module 194. The filtration module 194 may separate one or more insoluble particulates from the unreclaimed refrigerant composition 115. For example, the filtration module 194 may separate a plurality of insoluble particles from the unreclaimed refrigerant composition by filtration. In some embodiments, the unreclaimed refrigerant composition 115 is filtered through an at least 0.01 micrometer screen, an at least 0.03 micrometer screen, an at least 0.05 micrometer screen, an at least 0.08 micrometer screen, an at least 0.1 micrometer screen, or an at least 0.15 micrometer screen. In one embodiment, the unreclaimed refrigerant composition is filtered through a 0.1 micrometer screen. The filtration may result in the concentration of the one or more components being altered to less than the one or more predetermined thresholds in the unreclaimed refrigerant composition. Another method of removing relatively large unwanted materials comprises using physical sieves. Larger mesh sieves on the order of 50 microns down to 10 microns can be used to remove metals, particulate materials and residue (e.g., fluoropolymer particles). In one embodiment, the concentration of the one or more components may be altered resulting in an oil concentration of below 0.5 weight percent. In one embodiment, the concentration of the one or more components may be altered resulting in a reduction in the concentration of dyes. In one embodiment, the color of the unreclaimed refrigerant composition is altered to a Byk-Gardner color value of less than 3, preferably less than 2 and most preferably equal to 1. Another embodiment of this invention is employing several sieves within a series configuration such that refrigerant flows through all of the sieves removing different particulates and contaminants at each sieve or filter.

Another method for removing unwanted contaminant type materials, especially polymeric type residue (plasticizers, stabilizers and other materials), comprises using vapor transfer and refrigerant recovery where the unwanted polymeric type material remains in a liquid heel. In this method, the polymer or other higher molecular weight material is at a concentration that is still soluble in the refrigerant (or refrigerant blend) and therefore physical screening is not effective. Vapor transfer conveys the refrigerant in vapor form, from one cylinder to a different cylinder, leaving the unwanted heavier, polymeric material in the original cylinder. Vapor transfer and refrigerant recovery can be used in combination with the VTT (described below). Heat blanket or external cylinder heating can also be applied to the cylinders to aid in vapor transfer.

Driers can also be used to lower moisture levels and in combination with any of the above-mentioned methods.

Vertical Ton Tank (VTT)

In one embodiment, the inventive process uses a container which enables distribution, blending, transport, transfer, storage, recovery and usage of refrigerant in accordance with the instant invention. In the exemplary embodiments described herein the container is a 500 L to 1000 L, or more specifically, 750 L to 950 L or more specifically 850 L to 950 L vertical cylinder designed for holding, transferring or conveying a flammable compositions in accordance with the inventive process. Due to the vertical orientation, it lends itself to ease of processing of said refrigerant. It should be noted that any vertical cylinder designed for flammable refrigerants, can also be conveniently used for non-flammable refrigerants. The vertical ton tank has specific design parameters, which in the combinations noted below, make it uniquely useful in conjunction with other processes mention above. One or more vertical ton tanks may be used in the refrigeration distribution system 100 in various roles, including as the delivery vessel 110, distribution vessel 130, and/or recovery vessel 182.

Orientation

The vertical ton tank (VTT) cylinder is designed such that the pressure vessel is vertically oriented which implies that the cylinder is upright (vertical) during use, transport and storage. The specific orientation lends towards smaller physical footprint at a potential distribution location as footprint (m2) may be limited. Additionally, the vertical orientation design lends itself favorably towards the actual conveyance of the vertical ton tank. The vertical ton tank can be conveniently loaded onto a forklift without any loss of gravity or unusual positioning as is the case with the horizontal ton tank. The design of the base of the vertical ton tank is also designed to improve product conveyance. The bottom of the vertical ton tank has an integrated pallet with openings for the fork lift tines. Therefore, the described VTT can safely and conveniently be used to physically move flammable refrigerants to a remote recovery processing location.

Depending on the refrigerant being used in the inventive process, the pressure, flammability and volume will follow the appropriate design codes. In the US for example, the vertical ton tank will follow the ASME design construction and pressure rating, while in the EU the vertical ton tank will follow ADR and in Japan the vertical ton tank will follow HPGL.

Dip Tube Orientation

Figure 2:
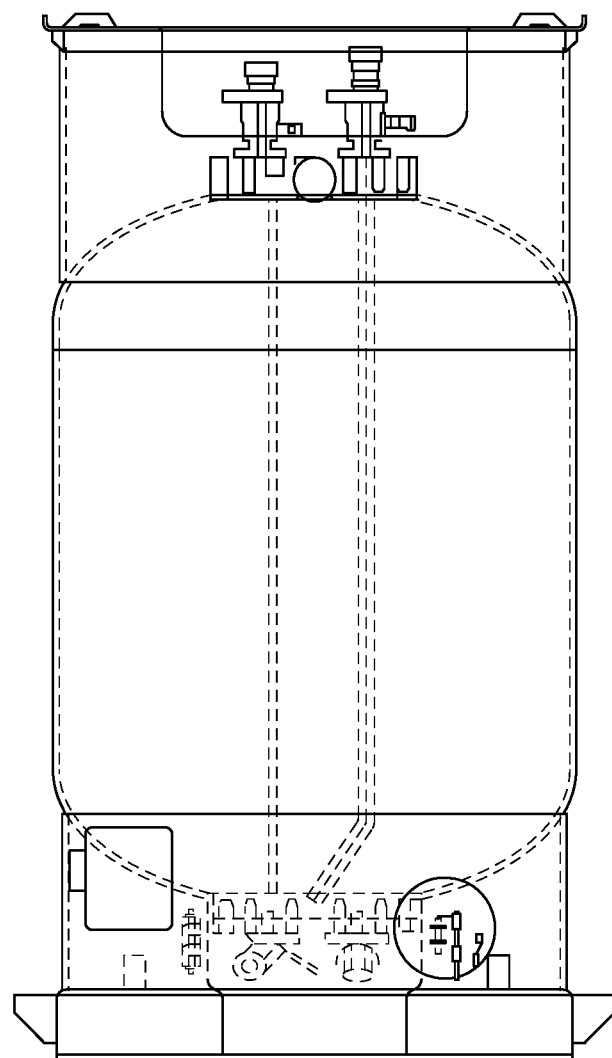
FIG. 2 is a front view of a vertical ton tank, according to an embodiment.
Figure 3:
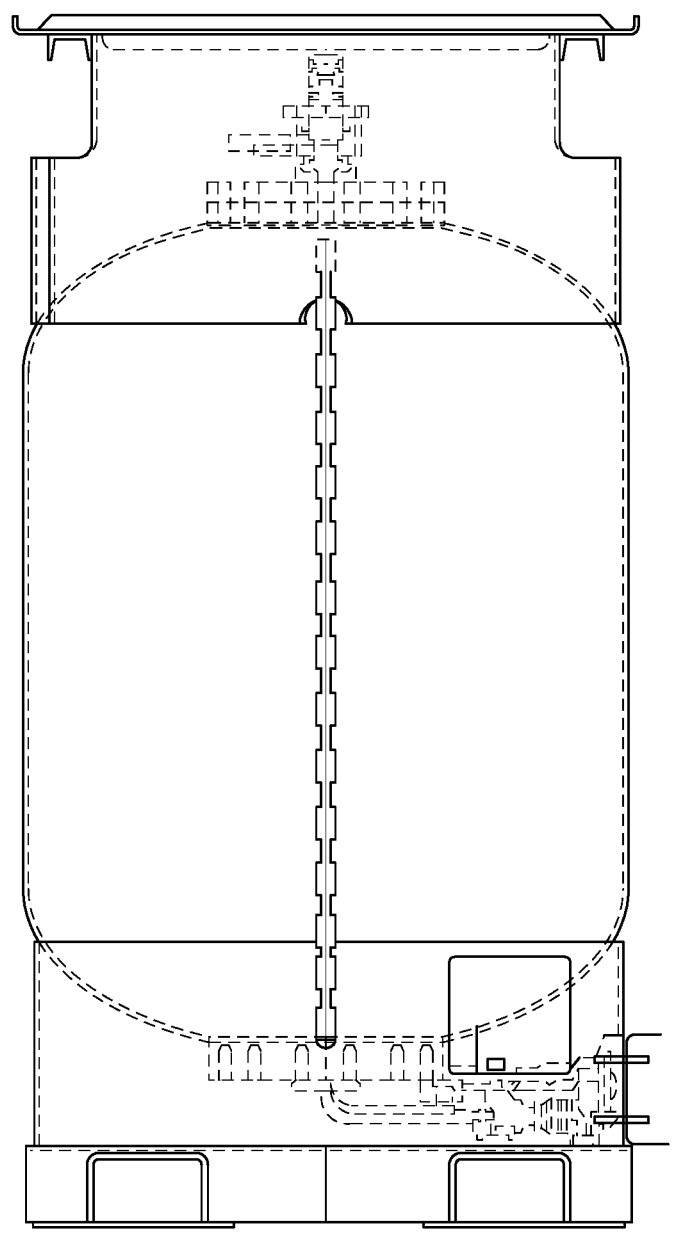
FIG. 3 is a side view of a vertical ton tank, according to an embodiment.

Another embodiment of the improved VTT are the locations and orientation of the dip tubes. While dip tubes are basic to cylinder design the combination of the location of the dips tubes with the flanges and orientation of the dip tubes to meet the upper and lower flanges as described in the next section provide unique product conveyance refrigerant. FIGS. 2 and 3 show a front and side view of an embodiment of the vertical ton tank (VTT) with dip tubes. Dip tubes 62 and 65 are shown with ½-inch and 1-inch connections at the top and bottom of the tank. The attachments of dip tubes 62 and 65 to top flange 60 and bottom flange 61 is also pictured. Items to note are #62 and #65 for dip tube orientation and how that mates with the top and bottom flange.

Bottom and Top Flanges

Another embodiment of the utility of the re-designed VTT are the additions and locations of flanges which also aid in the inventive process. While process refrigerant can be conveyed from VTT to another VTT or a separate storage container, it may be desirable to be able to get into the VTT to review what residues are left in said VTT. Therefore, the VTT has been designed to include two flanges marked as (top flange 60) and (bottom flange 61). The bottom and top flanges aid in opening the VTT tanks and taking visual inspection or easy inspection with a scoping process, such as a boroscope. The flanges also aid in easy removal of any debris that could collect from impurities. The flanges are shown in FIGS. 2 and 3.

Piping from Flanges to Valves

Figure 4A:
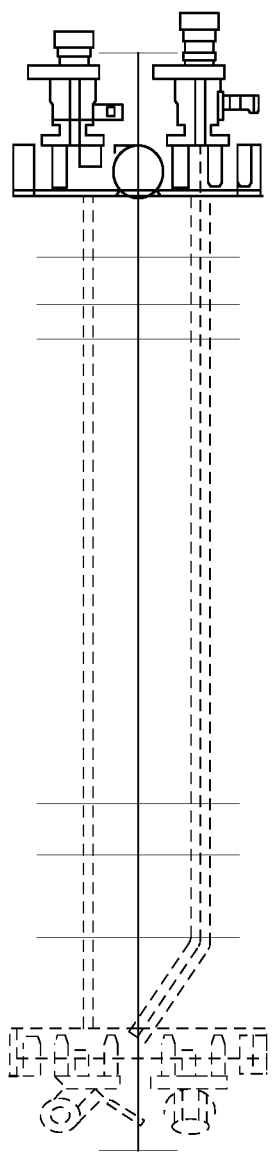
FIG. 4A is an expanded front view of the internal piping of the vertical ton tank, according to an embodiment.
Figure 4B:
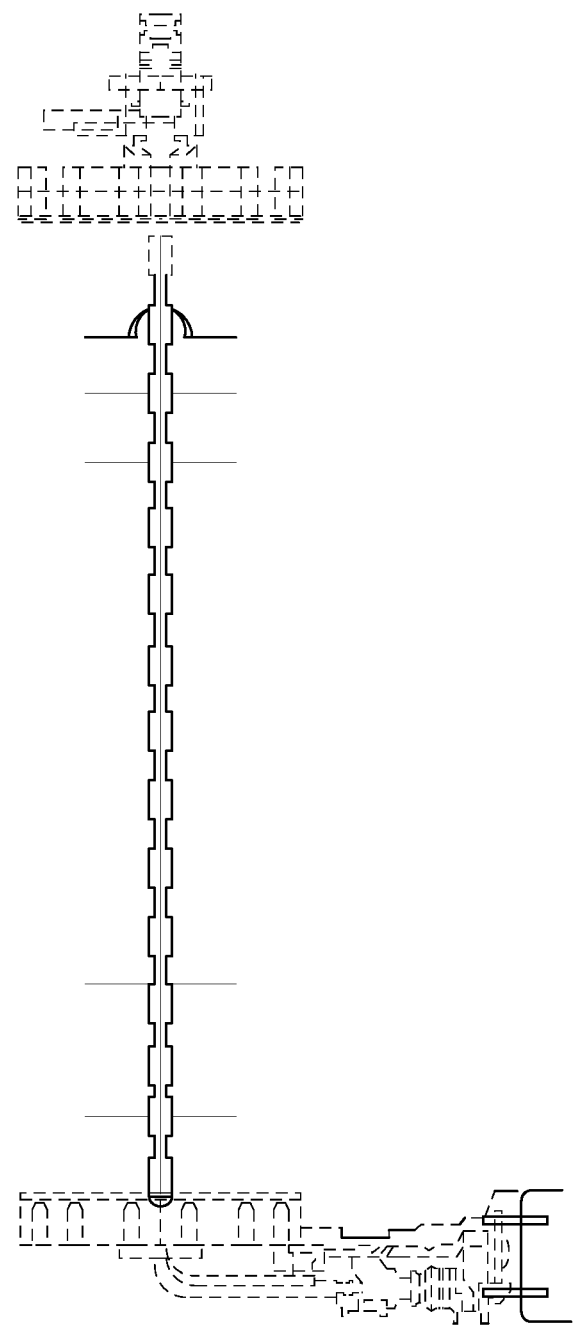
FIG. 4B is an expanded side view of the internal piping of the vertical ton tank, according to an embodiment.

Another embodiment in the re-designed VTT is the location and design piping/connections from the flanges to the valves. As can be seen from the diagram, the bottom flange has both larger and smaller drain pipe coming from the flange. FIG. 4 illustrates the location and orientation of the drain pipes. The smaller piping details are given in elements 83, 84, 85 (smaller flange) which connects to ½' pipe 64 which then leads out to a connector. The larger piping details are given in elements 87, 88, and 89 which connects to 1' pipe 63.

Figure 5:
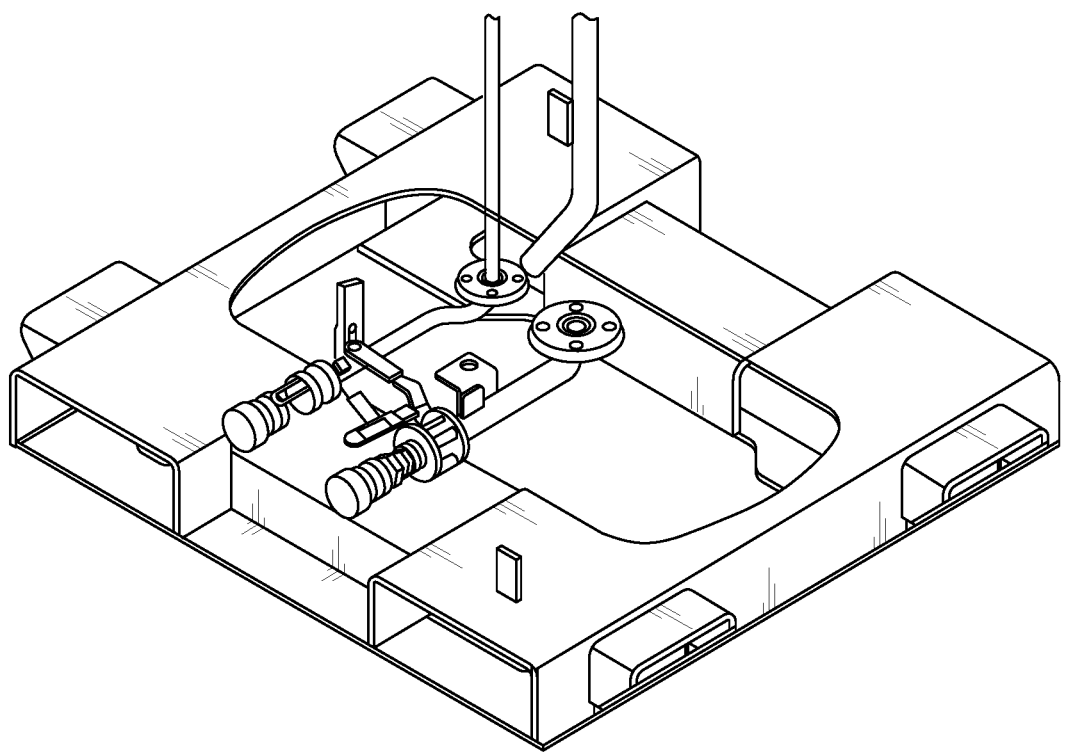
FIG. 5 shows the piping couplers of the vertical ton tank, according to an embodiment.
Figure 6:
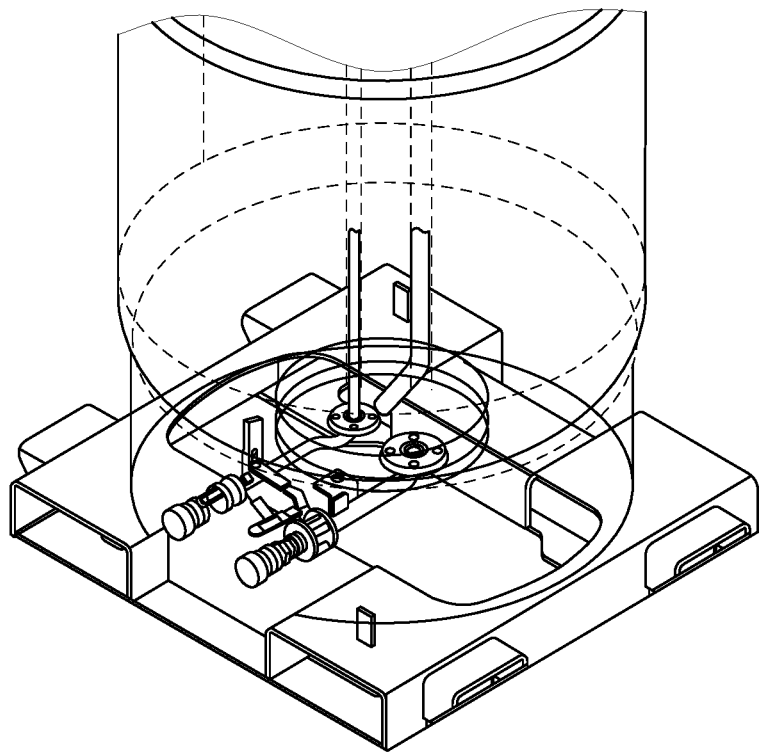
FIG. 6 is a view of the bottom portion of a vertical ton tank, according to an embodiment.

FIGS. 5 and 6 are expanded top and side views of the bottom portion of the (VTT). These diagrams show elements in more detail and how they configure into the main bottom flange.

| Parts List | |
|---|---|
| 86 | Goujon M20-55, bm 30 acier/Stud/carbon steel/42CrMo4 EN 10269 |
| 85 | Ecrou HH, M12 acier/Nut/carbon steel/25CrMo4 EN 10269 |
| 84 | Rondelle M12 acier zingué/Washer M12/galvanized carbon steel |
| 83 | Goujon M12-40, bm 18 acier/Stud/carbon steel/25CrMo4 EN 10269 |
| 82 | Ecrou HH, M20 acier/Nut HH, M20/carbon steel/42CrMo4 EN 10269 |
| 81 | Rondelle M20 acier zingué/Washer M20 galvanized carbon steel |
| 80 | Goujon M20-60, bm 30 acier/Stud/carbon steel/42CrMo4 EN 10269 |
| 69 | Bride PN50 DN15 1.4404 EN 10222-5 ou EN 10272 Flange PN50 DN 15 1.4404 EN 10222-5 ou EN 10272 |
| 68 | Bride PN50 DN25 1.4404 EN 10222-5 ou EN 10272 Flange PN50 DN 251.4404 EN 10222-5 ou EN 10272 |
| 64-65 | Tube Ø21.3 × 3.6 (½") départ gaz externe/inox 1.4404 EN 10216-5 (316 L) Pipe service gaz ½" × 3.6 Stainless steel 1.4404 EN 10216-5 |
| 62-63 | Tube Ø33.4 × 4.5 (1") reprise liquid inox 1.4404 EN 10216-5 (316 L) 1" Liquid outlet pipe tck 3.6 SS 1.4404 EN 10216-5 (316 L) |
| 61 | Trou de visite DN295 P355NL1 EN 10028-3/Visiting hole ND295 P355 NL1 |
| 60 | Trou de visite DN295 P355NL1 EN 10028-3/Visiting hole ND295 P355 NL1 |
| 27-29 | Plats support tuyauterie acier S235 JO/support flats acier S235 J0 EN 10025 |
| 26-28 | Plat support tuyauterie inox 1.4404/support flat stainless steel 1.4404 EN10028-7 |
| 138 | Rondelle M8 inox auténitique/washer M8 stainless steel |
| 137 | Robinet Male/Male ½" NPT MECA INOX/Ball valve ½" NPT MECA INOX |
| 136 | Robinet Male/Male 1" NPT MECA INOX/Ball valve 1" NPT MECA INOX |
| 135 | Ecrou H, M8 inox auténitique/Nut M8 × 30 stainless steel |
| 134 | Vis M 8 × 30 inox auténitique/screw M8 × 30 stainless steel |
| 133 | Goujon H, M12-40 bm 18, 25CrMo4 EN 10269/StudM12-40 bm 18 25CrMo4 EN 10269 |
| 132 | Joint plat Ø 40 × 30 × 2 PTFE/Gasket plat 40 × 30 × 2 PTFE |
| 131 | Joint plat Ø 323 × 305 × 3 PTFE/Gasket plat 323 × 305 × 3 PTFE |
| 130 | Joint plat Ø 51 × 38 × 2 × PTFE/Gasket plat 57 × 43 × 2 PTFE |
| 127 | Protecteur conique des robinets @ 80/protective adaptor W80 for valves |
| 126 | Mamelon 1" NPT inox 316 L/adaptor 1" NPT 316 L |
| 125 | Caps de protection palstique raccord TODO/plastic protection for TODO adaptor |
| 124 | Raccord (TODO tank units) 1" NPT/coupling (TODO tank units) 1" NPT |
| 123 | Mamelon ½" NPT/adaptor ½" NPT |
| 122 | Raccord (TODO tank units) ½" NPT/coupling (TODO tank units) ½" NPT |
| 121 | Robinet Female/Female 1" NPT MECA INOX/Ball valve 1" NPT MECA INOX |
| 120 | Robinet Female/Female ½" NPT MECA INOX/Ball valve ½" NPT MECA INOX |

Gaskets

Another design element is the addition of PTFE gaskets as shown which ensure that no additional contamination comes from gaskets. PTFE gaskets have been found to innocuous with HFO type products and therefore need to be used in combination with this design.

Valves

Another unique design element is the addition of dry bulk couplers (DBC) which limit the amount of refrigerant that can be released during refrigerant transfer. Dry bulk couplers have a specific locking mechanism which stops product transfer until the unlocking mechanism is engaged. After the unlocking mechanism is engaged, product is transferred. This mechanism reduces release of flammable products down to less than 1 gram and is very desirable in this VTT design. The combination of the DBC to this process aids in ease of product transfer, increases safety and limits and any unintentional exposure of refrigerant and/or contaminant. These are elements 122, 124 and 125 in the drawing. Adaptors from the metal piping to the DBC are element 123. DBC brands are commonly known as Denver Gardner TODO, Econosto valves, and Dixon valves.

Bottom Collar

The specifically designed VTT has a bottom collar that latches in place to protect the bottom valves associated with VTT. The collar keeps the forklift tines from potentially hitting the lower valves and/or flanges and therefore protects product. In addition, the bottom collar can be zip tied to aid in anti-counterfeit detection. Any braking of a certified zip lock can indicate that the product has been potentially tampered with.

Figure 7:
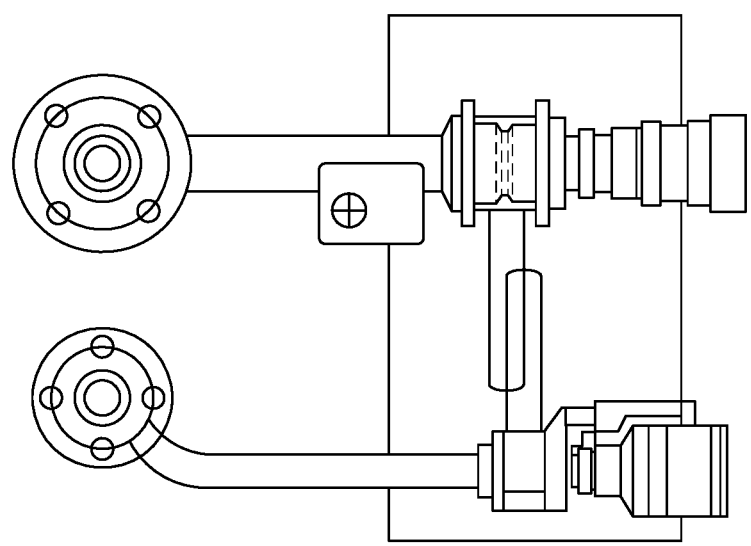
FIG. 7 is an expanded top view of the valve configuration of a vertical ton tank, according to an embodiment.
Figure 8:
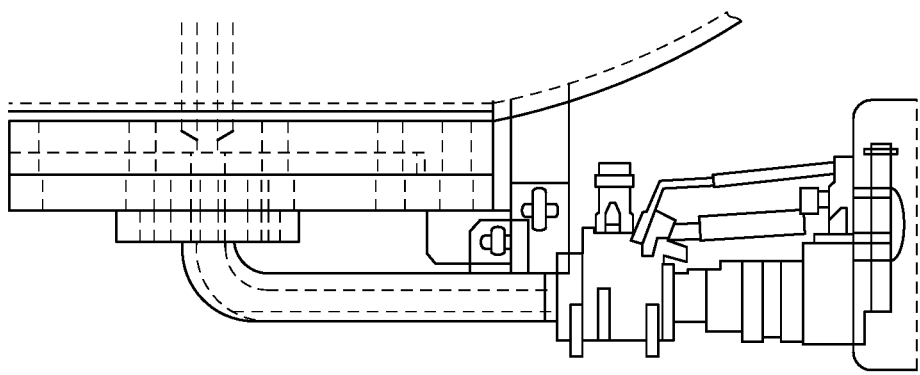
FIG. 8 is an expanded side view of the valve configuration of a vertical ton tank, according to an embodiment.
Figure 9:
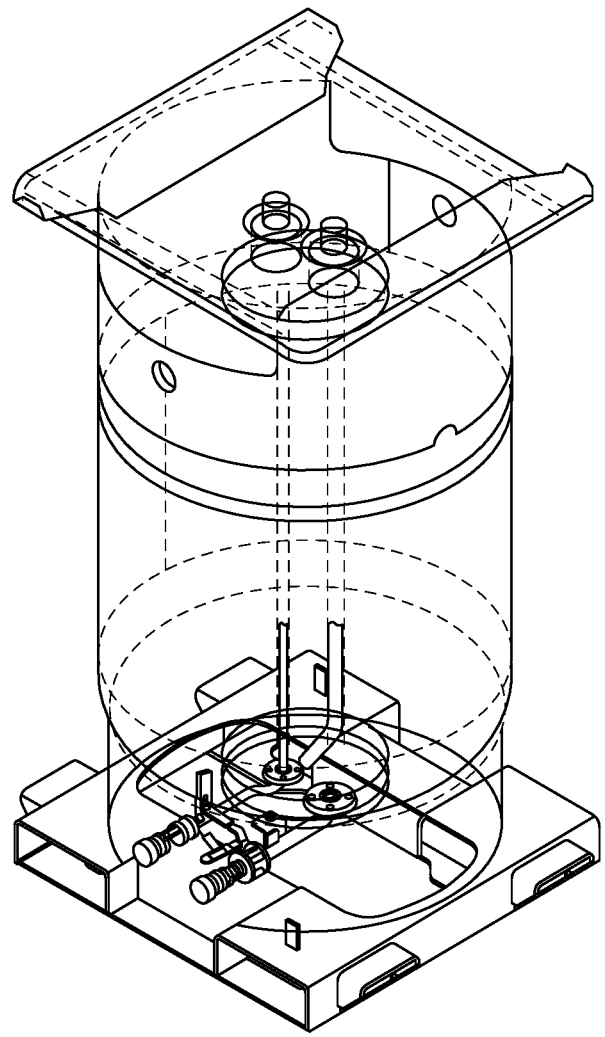
FIG. 9 is a view of a vertical ton tank having a bottom protective collar, according to an embodiment.
Figure 10:
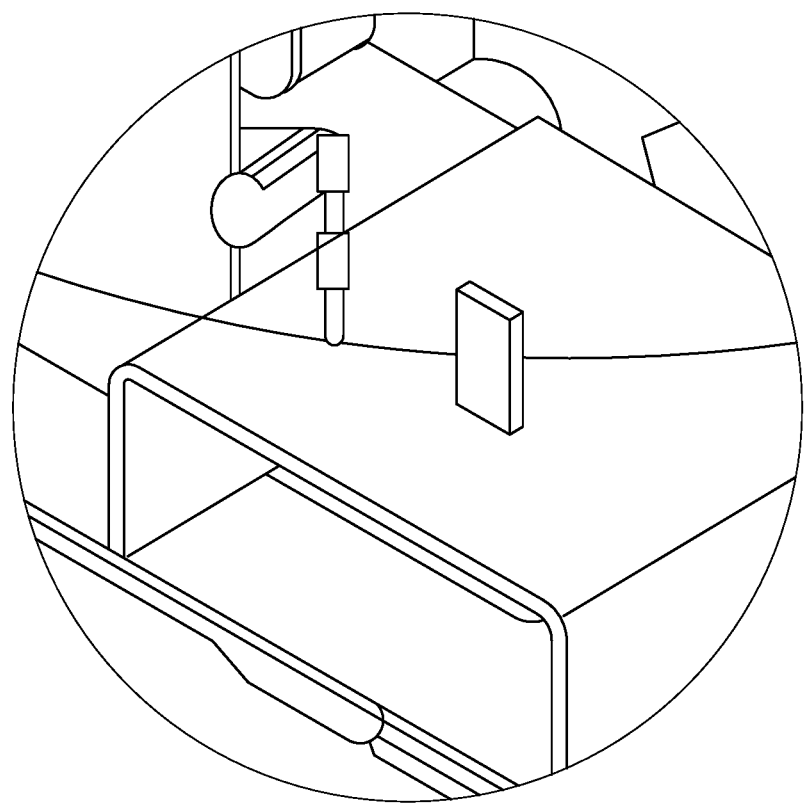
FIG. 10 shows a door as part of bottom protective collar of a vertical ton tank, according to an embodiment.

See FIG. 7 for an illustration how the collar fits over the valves. FIG. 8 shows protective door which may further protect the valves when the tank is not connected externally.

The following Examples are provided to illustrate certain embodiments of the invention and shall not limit the scope of the appended claims.

Example 1—Hydrolysis of Refrigerant Due to Excessive Moisture

When poor transferring, handling and storage practices are used, excessive amounts of moisture can get into the refrigerant. An illustrative example was conducted where a 50 wt % refrigerant/50 wt % water sample was placed in a sealed tube and then the sealed tube was placed in an oven. To accelerate the possible decomposition of refrigerant, the sealed tubes were placed in an explosion proof oven at 200 C for two weeks. At the end of the two weeks, the sealed tube was removed from the oven. The liquid refrigerant in the sealed tubes was visually observed for apparent color changes or aggregates. The liquid did not have any floating aggregates nor visual discoloration. However, once the liquid refrigerant was removed from the sealed tube, there was a small amount of white residue at the bottom of the sealed tube. Due to the extremely small amount of material formed, it was difficult to determine actual amount formed due to weight percent of residue. However, another parameter, acid number, was used as a surrogate for refrigerant decomposition. It was found that the acid number for the HFO-1234yf/water mixture was about double that of the HFC-134a/water mixture (e.g., the Acid Number can range from about 1.5 to about 5, in some cases about 2 to about 4.5 and typically about 2.2 to about 4.3 mg KOH). Therefore, limiting the amount of moisture that comes into contact with hydrofluoro-olefins for prolonged periods and at excessively high temperatures is most definitely desirable as indicated by the acid number.

| Sealed Tube | Acid Number | Visual |
|---|---|---|
| 1234yf 50 wt %/water 50 wt % | 4.35 mg KOH | small white residue |
| 1234yf 50 wt %/water 50 wt % | 2.23 mg KOH | small white residue |

Example 2—Decomposition of Refrigerant Due to Excessive NAG (Oxygen)

In another illustrative example, an excessive amount of air was added to the neat refrigerant to understand impacts of poor handling and or storage.

When poor transferring, handling and storage practices are used, excessive amounts of NAG can get into the refrigerant. An illustrative example was conducted where a 99 wt %/refrigerant/1 wt % NAG sample was placed in a sealed tube and then the sealed tube was placed in an oven. To accelerate the possible decomposition of refrigerant, the sealed tubes were placed in an explosion proof oven at several temperatures (175 C, 200 C and 225 C) for two weeks. At the end of the two weeks, the sealed tubes were removed from the oven. The liquid refrigerant in the sealed tubes was visually observed for apparent color changes or aggregates. The liquid did not have any floating aggregates nor visual discoloration. However, once the liquid refrigerant was removed from the sealed tube, there was a small amount of white residue at the bottom of the sealed tube.

Data is presented in the table below.

| LIQUID PHASE | | Oven | F-Ion | Cl-Ion | wt. | Wt. % |
|---|---|---|---|---|---|---|
| HFO-1234yf | Air | Temp °C. | ppm/g refrig | ppm/g refrig | residue-g/refrig | solids/refrig |
| 100 wt % | 0 wt % | 175 | ND | ND | 0.0 | 0.0 |
| 100 wt % | 0 wt % | 200 | ND | ND | 0.0067 | 0.3 |
| 99 wt % | 1 wt % | 175 | 1089 | ND | 0.0896 | 4.5 |
| 99 wt % | 1 wt % | 200 | 1165 | ND | 0.2426 | 12.1 |
| 99 wt % | 1 wt % | 225 | 36369 | ND | 1.4533 | 72.7 |

Therefore, limiting the amount of NAG (particularly oxygen) that comes into contact with hydrofluoro-olefins for prolonged periods and at excessively high temperatures is desirable as indicated by the amount of residue formed and the amount of liberated fluorine ion.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method for delivering an olefinic refrigerant to a refrigerant system, the method comprising:
    providing a distribution system arranged and disposed to deliver the olefinic refrigerant to the refrigerant system;
    measuring at least one distribution parameter of the olefinic refrigerant with one or more sensors within the distribution system; and
    selectively directing the olefinic refrigerant to either the refrigerant system or a recovery system with the distribution system based upon the refrigerant suitability for use in the refrigerant system in response to a comparison of the at least one distribution parameter and at least one threshold parameter,
    wherein the selectively directing includes directing the olefinic refrigerant to the recovery system when the at least one distribution parameter exceeds one or more of the following threshold parameters:
        a temperature measured with the one or more sensors exceeds a refrigerant temperature of 100° C.; and/or
        a non-absorbable gas concentration measured with the one or more sensors exceeds a refrigerant non-absorbable gas concentration of 1.5 volume percent at 25° C., per AHRI 700 (2016).

2. The method of claim 1, wherein the at least one distribution parameter is selected from the group consisting of refrigerant temperature, refrigerant non-absorbable gas concentration and combinations thereof.

3. The method of claim 1, wherein the distribution system further includes a distribution vessel, a transfer line, at least one pump, a distribution line and a distribution line branch.

4. The method of claim 3, wherein the distribution line is configured to mate with the refrigerant system to deliver the refrigerant to the refrigerant system.

5. The method of claim 4, wherein the one or more sensors are arranged and disposed to measure the at least one distribution parameter at the distribution line branch prior to delivering the refrigerant to the refrigerant system.

6. The method of claim 1, wherein the recovery system includes a recovery vessel.

7. The method of claim 1, wherein the non-absorbable gas is oxygen.

* * * * *